J. L. ROUTIN.
FIRE CONTROL TACHOMETER.
APPLICATION FILED JULY 25, 1917.

1,345,699.                                Patented July 6, 1920.

Joseph Louis Routin
By Mauro, Cameron, Lewis & Massie
Attorneys

UNITED STATES PATENT OFFICE.

JOSEPH LOUIS ROUTIN, OF PARIS, FRANCE.

FIRE-CONTROL TACHOMETER.

1,345,699. Specification of Letters Patent. Patented July 6, 1920.

Application filed July 25, 1917. Serial No. 182,789.

*To all whom it may concern:*

Be it known that I, JOSEPH LOUIS ROUTIN, a citizen of the French Republic, residing at 2 Rue Olchanski, Paris, France, have invented a new and useful Fire-Control Tachometer, which is fully set forth in the following specification.

The present invention has for its object to provide a particular form of embodiment of a tachochronometer based on the principles defined in my application for patent Serial No. 182,311, filed July 23, 1917, now Patent No. 1,345,697, dated July 6, 1920, and enables the determination of the product of azimuthal or zenithal velocity of an aerial objective by the time of flight of the projectile.

In the following it will be assumed, for instance, that one has to determine the product of the azimuthal speed of the aerial target by the time of flight of the target, which will be designated respectively, as in the principal application, by $\frac{d\omega}{dt}$ and $t_2$.

Figure 1:
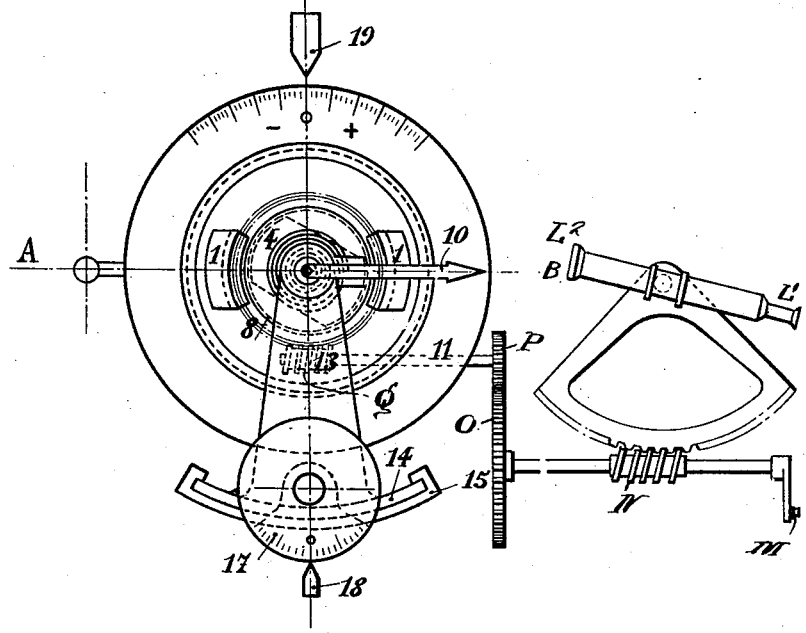
Figure 2:
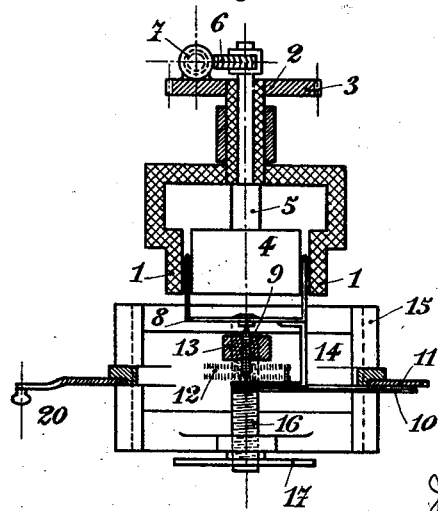

In the annexed drawings Figures 1 and 2 show the details of the apparatus. Fig. 1 is a front view and Fig. 2 a section through line A B of Fig. 1.

1 is a permanent magnet mounted on the hollow shaft 2 driven by the pinion 3 at a speed proportional to $\frac{d\omega}{dt}$ resulting from the angular movements of a sighting device through suitable multiplying gear. Such means are diagrammatically indicated at the right of Fig. 1 consisting of a sighting telescope $L_1$ $L_2$ operated by a handle M through worm gearing N. Multiplying gears OP and worm Q transmit the movements to the tachometer gear 3.

4 is a soft iron core having, as shown in the drawing the form of a cylinder cut off on two planes parallel to its axis. This cylinder is integral with a rod 5 on which is mounted a toothed sector 6 which engages with the screw 7 which rotates in bearings fixed on the pinion 3.

8 is a cylindrical copper bell housed in the annular space provided between 1 and 4 and mounted so that it can rotate on the ends of the axle 9; this bell is integral with a pointer 10 which moves over a graduated dial 11. Two spiral springs 12 constantly Be it known that I, JOSEPH LOUIS ROUTIN, position.

The axle 9 is integral with a support 13 which supports the dial 11 and which rests on a plate 14 guided in the fixed slide 15. By means of a screw 16, provided with a graduated dial 17 which is rotatable before a fixed point 18, the support 13, the index 10, the dial 11 and the bell 8 can be simultaneously displaced with respect to the frame supporting magnet 1 and its core 4.

The device forms a magnetic tachometer indicating the orientation of the core 4 with respect to the magnet 1 and also of the extent of movement of the bell 8. To gage the apparatus the screw 7 is operated. The dial 17 is experimentally graduated, either in time functions of the flight $t_2$ or in functions of the distance D.

The device thus far described operates in the following manner:

The position of magnet core 4 is adjustable to give the desired strength of field between the poles of magnet 1 and the core by turning screw 7 which engages the toothed sector on magnet rod 5. Pinion 3, assumed to be driven at a speed proportional to the azimuthal speed $\frac{d\omega}{dt}$ rotates magnet 1 and magnet core 4. Copper bell 8 is thus subjected to the action of a rotating magnet field and is angularly deflected in the same direction to an extent proportional to speed $\frac{d\omega}{dt}$. If, however, the bell 8 is moved by aid of screw 16 to cut more magnetic lines, there will be a greater torque on the spring-opposed dial hand 10 for the same azimuthal speed $\frac{d\omega}{dt}$. By moving screw 16 proportional to duration of flight $t_2$ while pinion 3 rotates at the azimuthal speed $\frac{d\omega}{dt}$, the index 10 will move proportionally to the product of time and speed, or $t_2\frac{d\omega}{dt}$.

Although not indispensable it is preferable, as in the principal application to automatically control the displacement of support 13 by means of a mechanical transmitter connecting the tachochronometer with the telechronograph post.

To arrive at the corrections which do not depend on the speed of the target, it is sufficient to rotate the dial 11 with respect to the fixed point 19 arranged opposite the position assumed by the index 10 when the speed $\frac{d\omega}{dt}$ is zero. For this purpose the lever 20 is actuated.

What I claim as my invention and desire to secure by Letters Patent of the United States is:—

1. In chronotelemetrical apparatus for regulating the firing of anti-aircraft guns, a magnetic or electromagnetic tachometer wherein the flux is varied so as to indicate the product of a speed by a time, the device being so arranged that it can be gaged by bringing the maximum flux to a constant value by means of independent regulating means.

2. In chronotelemetrical apparatus for regulating the firing of anti-aircraft guns, a magnetic or electromagnetic tachometer wherein the flux is varied so as to indicate the product of a speed by a time, comprising a revoluble magnet and core, an induction element revoluble under the influence of said magnet and adapted to be angularly displaced in proportion to the speed of rotation of said magnet, means for adjusting said element in the flux of said magnet while the magnet rotates thereby varying the inductive action on the element and its displacement in proportion to a time, and means for adjusting said core in respect to the poles of said magnet to regulate the flux to a predetermined value for acting on said element.

In testimony whereof I have signed this specification in the presence of two subscribing witnesses.

JOSEPH LOUIS ROUTIN.

Witnesses:
 HENRI MONIN,
 CHAS. P. PRESSLY.